UNITED STATES PATENT OFFICE.

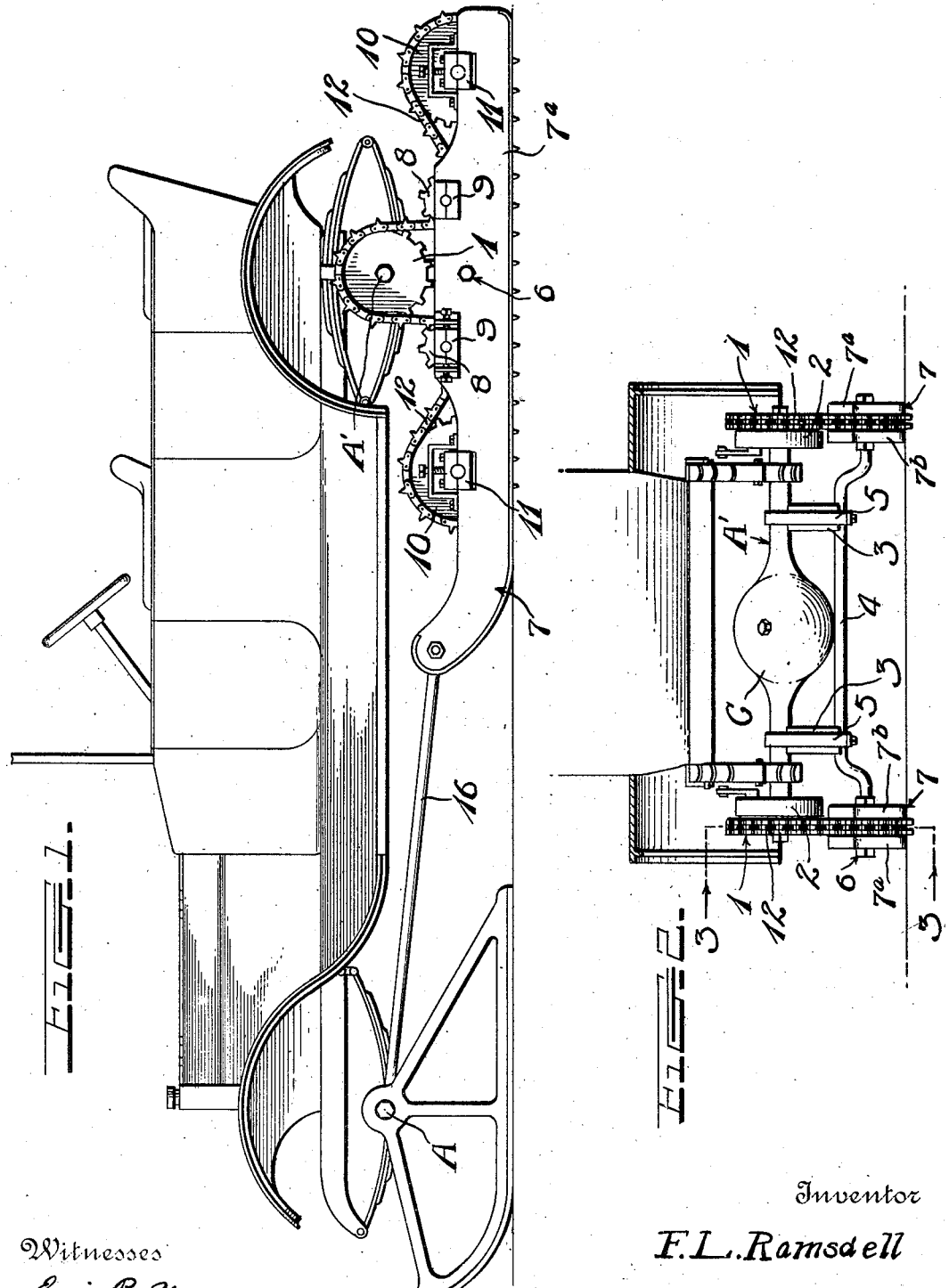

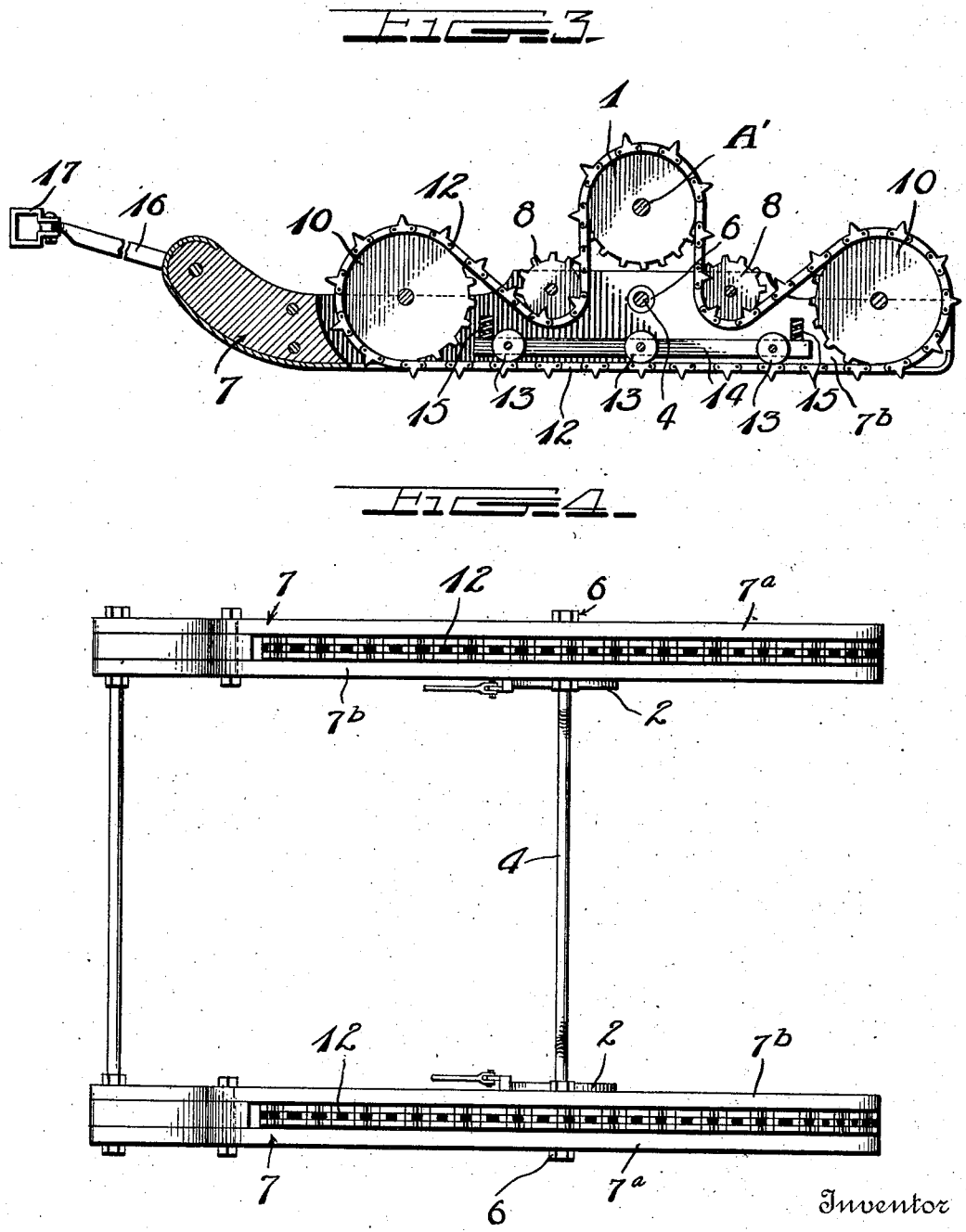

FRED L. RAMSDELL, OF HAYWARD, WISCONSIN.

RUNNER ATTACHMENT FOR AUTOMOBILES.

1,154,431. Specification of Letters Patent. Patented Sept. 21, 1915.

Application filed April 26, 1915. Serial No. 23,915.

*To all whom it may concern:*

Be it known that I, FRED L. RAMSDELL, a citizen of the United States, residing at Hayward, in the county of Sawyer and State of Wisconsin, have invented certain new and useful Improvements in Runner Attachments for Automobiles; and I do declare the following to be a full, clear, and exact description of the invention, such as will enable others skilled in the art to which it appertains to make and use the same.

My invention relates broadly to improvements in runners, and specifically to such devices adapted more particularly for attachment to the rear driven axles of motor vehicles.

The object of the invention is to provide means of this class which although being very simple and inexpensive in construction, will be efficient in operation and will possess a number of advantageous features, allowing practically any type of automobile to be converted into a motor driven sleigh.

With this general object in view, the invention resides in certain novel features of construction and in combinations of parts hereinafter described and claimed, one embodiment of the invention being illustrated in the accompanying drawings wherein like reference characters designate corresponding parts throughout the several views and wherein:—

Figure 1 is a side elevation of an automobile showing the application of the invention thereto; Fig. 2 is a rear elevation of a portion of the machine equipped with the attachment; Fig. 3 is a vertical longitudinal section taken along the plane designated by the line 3—3 of Fig. 2 showing the chain depressing means. Fig. 4 is a bottom plan view of the attachment removed from the machine.

In these drawings, constituting a part of the application, an automobile is shown including the usual front and rear axles A and A', the latter being rotated by any preferred means acting in conjunction with the compensating gear or differential disposed in the casing C, the latter being interposed between the two independently movable sections of the axle A' as is common on motor vehicles.

In these drawings, the rear wheels previously secured to the opposite ends of the axle A' are replaced by a pair of sprocket wheels 1 keyed to said axle and having brake drums or the like 2 on their inner sides cooperating with the usual brake shoes carried by the vehicle and operable from a foot pedal or the like in advance of the driver's seat.

Depending from the casing surrounding the axle A', is a pair of saddle blocks 3 beneath which an arched transverse shaft 4 is disposed, the shaft and the blocks 3 being secured to the axle A' by clamps 5 which may be removed when the runner attachment is to be detached. The opposite ends of the arched shaft 4 pass through bearings 6 disposed between the ends and near the upper edges of a pair of runners 7, each of these runners being composed of outer longitudinally disposed sections 7ª and inner sections 7ᵇ spaced from and lying parallel with said outer sections, the two sections of each runner being connected at proper intervals by any preferred means. As clearly disclosed in Fig. 2, the sprocket wheels 1 are disposed directly above the spaces between the inner and outer runner sections 7ᵇ and 7ª, this being essential for reasons yet to appear.

Disposed between the inner and outer sections of each runner and located one in advance of and one in rear of each sprocket 1, is a pair of guide sprockets 8 having shafts mounted in longitudinally adjustable bearings 9 while disposed one between the front ends of the runner sections, and one between the rear ends thereof, is a plurality of sprockets 10 mounted in vertically adjustable bearings 11. The lower edges of the sprockets 10 are disposed approximately in the planes in which the lower edges of the runners 7 lie, while the upper edges of the sprockets 8 are spaced considerable distances above such planes.

Over the numerous sprockets above described, a pair of endless pronged tread chains 12 pass, the lower reaches of these chains being disposed between the front and rear sprockets 10, while the upper reaches thereof pass beneath the sprockets 8 and then over those designated at 1. Thus it will be evident that when these last named sprockets are driven by the operation of the motor of the automobile, the tread chains 12 will be moved in a direction to propel the vehicle forwardly when the prongs of said chains come in contact with the road-bed.

Although the device will operate to advantage when including only the features above described, it is preferable to incorporate chain depressing means for forcing the lower reaches of the tread chains 12 downwardly, thereby insuring that their prongs be forcibly embedded in the road-bed for the purpose of preventing the chains from skidding thereon. In the present application of the invention, such depressing means is shown in the form of trios of sprockets, rollers or the like 13 interposed between the inner and outer sections of the runners 7, contacting with the upper sides of the chains 12, and carried by bars or other appropriate carriages 14 which are slidable vertically between the aforesaid inner and outer sections of the runners, coil springs or the like 15 being preferably provided for the purpose of forcing the carriages 14 downwardly to project their rollers 13 and the lower stretches of the chains 12 toward the road-bed.

In addition to the parts so far described, any preferred type of tongue 16 preferably leads from the runners 7 to the front axle of the automobile and is secured thereto by a clamp 17 which may be readily removed when necessary.

From the foregoing description, taken in connection with the accompanying drawings, it will be evident that although very simple construction has been provided for carrying out the object of the invention, the same will possess a number of advantageous features and will be highly efficient in operation, particular emphasis being laid upon the provision of the chain depressing means, as well as upon the general construction and arrangement of parts.

In the drawings, I have shown certain specific details of construction for producing probably the best results, and in the preceding, have described such details, but it will be evident that I need not be limited thereto, otherwise than to the extent to which the appended claims limit me. Furthermore, although the invention is shown as applied to an automobile, in which case the front wheels thereof are also replaced by runners, it will be evident that the improved features of the device could well be applied to other uses.

I claim:

1. An attachment for converting an automobile into a power sleigh, consisting of a pair of parallel vertically oscillatory runners, each having propelling means, an arched shaft having horizontal end portions on which the two runners are pivotally mounted, and clamps for securing said shaft to the rear automobile axle.

2. An attachment for converting an automobile into a power sleigh, consisting of a pair of parallel vertically oscillatory runners each having propelling means, an arched shaft having horizontal end portions on which the two runners are pivotally mounted, saddle blocks interposed between the rear automobile axle and said arched shaft, and clamps passing around the axle, the saddle blocks, and the arched shaft.

In testimony whereof I have hereunto set my hand in presence of two subscribing witnesses.

FRED L. RAMSDELL.

Witnesses:
 H. M. FULER,
 E. E. POWERS.